United States Patent
Yun et al.

(10) Patent No.: US 9,953,682 B2
(45) Date of Patent: Apr. 24, 2018

(54) APPARATUS AND METHOD FOR PROVIDING SENSORY EFFECTS FOR VESTIBULAR REHABILITATION THERAPY

(71) Applicant: Electronics and Telecommunications Research Institute, Daejeon (KR)

(72) Inventors: Jae-Kwan Yun, Daejeon (KR); Hyun-Woo Oh, Daejeon (KR); Jong-Hyun Jang, Daejeon (KR); Jae-Doo Huh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 19 days.

(21) Appl. No.: 14/940,535

(22) Filed: Nov. 13, 2015

(65) Prior Publication Data
US 2016/0269678 A1 Sep. 15, 2016

(30) Foreign Application Priority Data
Mar. 11, 2015 (KR) .......................... 10-2015-0033863

(51) Int. Cl.
*G11B 27/34* (2006.01)
*H04N 21/435* (2011.01)
(Continued)

(52) U.S. Cl.
CPC ............ *G11B 27/34* (2013.01); *G11B 27/031* (2013.01); *G11B 27/10* (2013.01);
(Continued)

(58) Field of Classification Search
CPC ....... G11B 27/34; G11B 27/031; G11B 27/10; H04N 21/4131; H04N 21/435; H04N 21/43615
See application file for complete search history.

(56) References Cited

U.S. PATENT DOCUMENTS 8,245,124 B1 * 8/2012 Gupta .................. G11B 27/034
715/202
2004/0015983 A1 * 1/2004 Lemmons ................ H04N 5/44
725/12
(Continued)

FOREIGN PATENT DOCUMENTS

KR 1020050005653 A 1/2005
KR 1020050116916 A 12/2005
(Continued)

OTHER PUBLICATIONS

Kyoungro Yoon et al., "4-D Broadcasting with MPEG-V," 2010 IEEE International Workshop, Oct. 4, 2010, pp. 257-262, IEEE.
(Continued)

*Primary Examiner* — Hung Dang
*Assistant Examiner* — Sunghyoun Park
(74) *Attorney, Agent, or Firm* — William Park & Associates Ltd.

(57) ABSTRACT

A system for providing sensory effects according to an embodiment of the present invention comprises an apparatus for providing vestibular rehabilitation videos configured to correct playback time of sensory effect metadata included in a plurality of integrated files based on start time of transport stream, and generate transport stream including the sensory effect metadata; and a gateway configured to receive the transport stream from the apparatus for providing vestibular rehabilitation videos, extract audio data, video data and the sensory effect metadata from the transport stream, transmit the audio data and the video data to a video player, and transmit the sensory effect metadata to an apparatus for providing sensory effects based on the corrected playback time.

11 Claims, 9 Drawing Sheets

(51) Int. Cl.
*H04N 21/41* (2011.01)
*G11B 27/031* (2006.01)
*G11B 27/10* (2006.01)
*H04N 21/436* (2011.01)
*H04N 7/08* (2006.01)

(52) U.S. Cl.
CPC ....... *H04N 21/4131* (2013.01); *H04N 21/435* (2013.01); *H04N 21/43615* (2013.01); *H04N 7/08* (2013.01)

(56) References Cited

U.S. PATENT DOCUMENTS

| | | | | |
|---|---|---|---|---|
| 2006/0127052 | A1* | 6/2006 | Furukawa | G11B 27/034 386/201 |
| 2008/0297654 | A1* | 12/2008 | Verberkt | G06T 1/0021 348/500 |
| 2009/0076936 | A1* | 3/2009 | Wright | G06Q 30/00 705/34 |
| 2010/0198797 | A1* | 8/2010 | Wideman | G06F 17/30156 707/692 |
| 2010/0268745 | A1* | 10/2010 | Choi | G11B 27/105 707/802 |
| 2011/0093092 | A1* | 4/2011 | Choi | A47C 1/12 700/11 |
| 2011/0246616 | A1* | 10/2011 | Ronca | H04N 21/26258 709/219 |
| 2011/0254670 | A1* | 10/2011 | Han | G06F 3/016 340/407.1 |
| 2012/0239712 | A1* | 9/2012 | Lee | G11B 27/034 707/821 |
| 2012/0242572 | A1 | 9/2012 | Lee et al. | |
| 2012/0281138 | A1 | 11/2012 | Choi et al. | |
| 2013/0024756 | A1* | 1/2013 | Basso | H05B 37/02 715/202 |
| 2013/0103703 | A1* | 4/2013 | Han | H04N 21/4126 707/755 |
| 2014/0003652 | A1* | 1/2014 | Fedorovskaya | G06F 17/30286 382/103 |
| 2014/0223506 | A1 | 8/2014 | Etri | |

FOREIGN PATENT DOCUMENTS

| | | |
|---|---|---|
| KR | 1020090038835 A | 4/2009 |
| KR | 1020120107431 A | 10/2012 |
| KR | 101381134 B1 | 3/2014 |
| KR | 1020140093398 A | 7/2014 |
| KR | 1020140099146 A | 8/2014 |
| WO | 2009051428 A1 | 4/2009 |

OTHER PUBLICATIONS

Jae-Kwan Yun et al., "Development of a Vestibular Rehabilitation Therapy Media Gateway Using Multi-Sensorial Effects," 2014 IEMEK Conference, Nov. 13-15, 2014, pp. 243-247, Institure of Embedded Engineering of Korea.

* cited by examiner

Foothold CoM sensor type

Chair CoM sensor type

Human body inclination

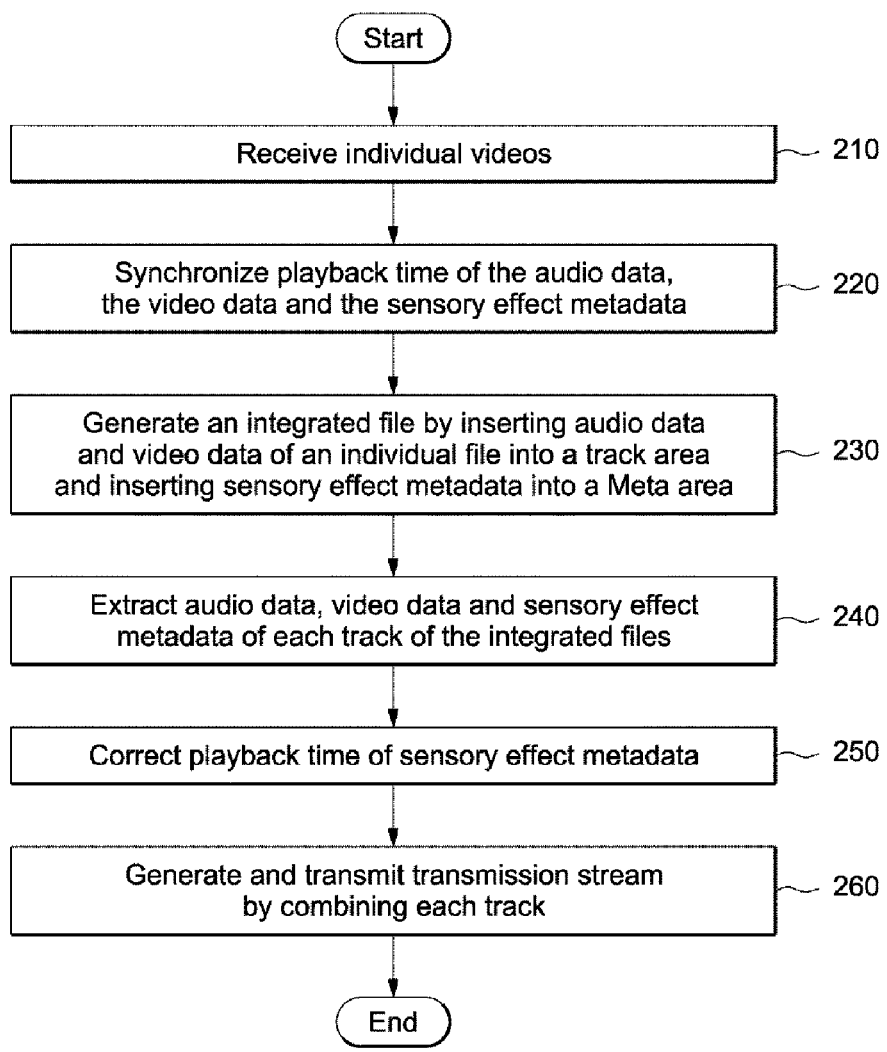

APPARATUS AND METHOD FOR PROVIDING SENSORY EFFECTS FOR VESTIBULAR REHABILITATION THERAPY

CROSS REFERENCE TO RELATED APPLICATION

This application claims the benefit of Korean Patent Application No. 10-2015-0033863, filed on Mar. 11, 2015, entitled "Apparatus and method for providing sensory effects for vestibular rehabilitation therapy", which is hereby incorporated by reference in its entirety into this application.

BACKGROUND OF THE INVENTION

1. Technical Field

The present invention relates to sensory effect technology and more particularly, to an apparatus and method for providing sensory effects for efficient vestibular rehabilitation therapy.

2. Description of the Related Art

A vestibular rehabilitation therapy is generally an exercise-based treatment to alleviate symptoms of patients' who experience dizziness and imbalance for quality of life. Most of vestibular rehabilitation treatments are administering sedatives or similar drugs thereof for dizziness. However, such treatments usually reduce moment dizziness rather than the underlying cause. The symptoms rather persist and balance ability becomes worse.

Thus, exercise-based vestibular rehabilitation treatments are receiving more attention.

Exercise-based vestibular rehabilitation methods can be divided into 2 categories. One is vestibular habituation exercise which is designed to repeat specific movements or positions that provoke the dizziness or vertigo and the other is designed to repeat eye and head movements. Conventionally, a patient who needs the vestibular rehabilitation therapy is asked to follow a pattern with his/her eyes for the treatment when videos of complicated glances or shaking videos are shown to the patient. Videos for the vestibular rehabilitation therapy taken by physicians or physical therapists are also shown to a patient to follow.

SUMMARY OF THE INVENTION

An object of the present invention is to provide an apparatus and method for providing sensory effects for vestibular rehabilitation therapy.

According to an aspect of the present invention, there is provided a system for providing sensory effects comprising: an apparatus for providing vestibular rehabilitation videos configured to correct playback time of sensory effect metadata included in a plurality of integrated files based on start time of transport stream and generate transport stream including the sensory effect metadata; and a gateway configured to receive the transport stream from the apparatus for providing vestibular rehabilitation videos, extract audio data, video data and the sensory effect metadata from the transport stream, transmit the audio data and the video data to a video player, and transmit the sensory effect metadata to an apparatus for providing sensory effects based on the corrected playback time.

The apparatus for providing vestibular rehabilitation videos may correct the playback time of sensory effect metadata according to sum of accumulated playback time of the integrated file and the playback time of sensory effect metadata.

The apparatus for providing vestibular rehabilitation videos may generate the integrated file by arranging audio data, video data and sensory effect metadata of an individual file among a plurality of individual files to be adjacent each other and arranging audio data of another individual file to be adjacent to the sensory effect metadata of the individual file; and convert the integrated file into the transport stream when a predetermined event occurs.

The gateway may obtain constant delay corresponding to a plurality of video players and apparatuses for providing sensory effects, transmit the audio data and the video data to the video player based on the constant delay, and transmit the sensory effect metadata to the apparatus for providing sensory effects based on the constant delay.

The gateway may transmit time information to the video player and the apparatus for providing sensory effects and obtain the constant delay from the video player and the apparatus for providing sensory effects.

The gateway may change the sensory effect metadata based on predetermined sensory effect control information.

According to another aspect of the present invention, there is provided a method for providing sensory effects in a method for providing sensory effects by a system for providing sensory effects, the method comprising: correcting playback time of sensory effect metadata included in a plurality of integrated files based on start time of transport stream and generating transport stream including the sensory effect metadata by an apparatus for providing vestibular rehabilitation videos; receiving the transport stream from the apparatus for providing vestibular rehabilitation videos and extracting audio data, video data and the sensory effect metadata from the transport stream by a gateway; and transmitting the audio data and the video data to a video player and transmitting the sensory effect metadata to an apparatus for providing sensory effects based on the corrected playback time by the gateway.

The step, for correcting playback time of sensory effect metadata included in a plurality of integrated files based on start time of transport stream and generating transport stream including the sensory effect metadata by an apparatus for providing vestibular rehabilitation videos, may comprise correcting sum of accumulated playback time of the integrated file and the playback time of sensory effect metadata with the playback time of sensory effect metadata by the apparatus for providing vestibular rehabilitation videos.

The step, for correcting playback time of sensory effect metadata included in a plurality of integrated files based on start time of transport stream and generating transport stream including the sensory effect metadata by an apparatus for providing vestibular rehabilitation videos, may comprise generating the integrated file by arranging audio data, video data and sensory effect metadata of an individual file among a plurality of individual files to be adjacent each other and arranging audio data of another individual file to be adjacent to the sensory effect metadata of the individual file by the apparatus for providing vestibular rehabilitation videos; and converting the integrated file into the transport stream when a predetermined event occurs by the apparatus for providing vestibular rehabilitation videos.

The method for providing sensory effects may further comprise obtaining constant delay corresponding to a plurality of video players and apparatuses for providing sensory effects, wherein the step, for transmitting the audio data and the video data to a video player and transmitting the sensory effect metadata to an apparatus for providing sensory effects based on the corrected playback time by the gateway, may comprise transmitting the audio data and the video data to the video player based on the constant delay and transmitting the sensory effect metadata to the apparatus for providing sensory effects based on the constant delay.

The method for providing sensory effects may further comprise changing the sensory effect metadata based on predetermined sensory effect control information by the gateway.

According to an embodiment of the present invention, it allows for a plurality of video players and apparatuses for providing sensory effects to interoperate at the exact time.

According to an embodiment of the present invention, it also maximize sensory effects by providing sensory effects such as images, wind, light, temperature, vibration, scent and the like taken from multiple directions to a user.

According to an embodiment of the present invention, it also allows to utilize an apparatus for providing sensory effects anywhere by transmitting vestibular rehabilitation sensory effect metadata to a user by using broadcasting technology.

BRIEF DESCRIPTION OF THE DRAWINGS

FIG. 3 is a flowchart illustrating a process for transmitting transmission data by an apparatus for providing vestibular rehabilitation videos of a system for providing sensory effects according to an embodiment of the present invention.

DESCRIPTION OF THE EXEMPLARY EMBODIMENTS

While the present invention has been described with reference to particular embodiments, it is to be appreciated that various changes and modifications may be made by those skilled in the art without departing from the spirit and scope of the present invention, as defined by the appended claims and their equivalents.

Throughout the description of the present invention, when describing a certain technology is determined to evade the point of the present invention, the pertinent detailed description will be omitted. While such terms as "first" and "second," etc., may be used to describe various components, such components must not be limited to the above terms. The above terms are used only to distinguish one component from another.

When one element is described as being "connected" or "accessed" to another element, it shall be construed as being connected or accessed to the other element directly but also as possibly having another element in between.

Hereinafter, certain embodiments of the present invention will be described with reference to the accompanying drawings, in which those components are rendered the same reference number that are the same or are in correspondence, regardless of the figure number.

Figure 1:
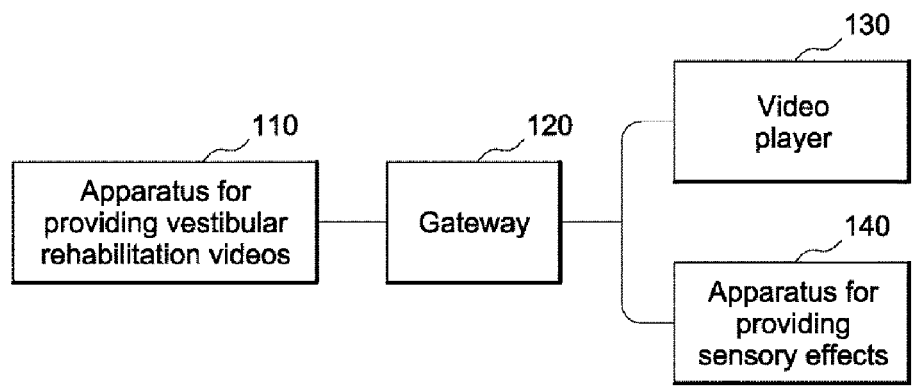
FIG. 1 is a block view illustrating a system for providing sensory effects according to an embodiment of the present invention.
Figure 2A:
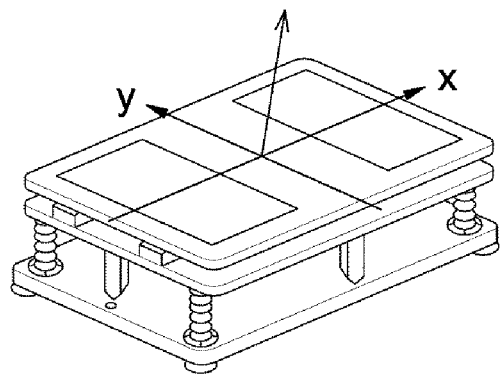
FIGS. 2A, 2B, and 2C illustrate sensors detect inclined direction of a human body according to an embodiment of the present invention.
Figure 2B:
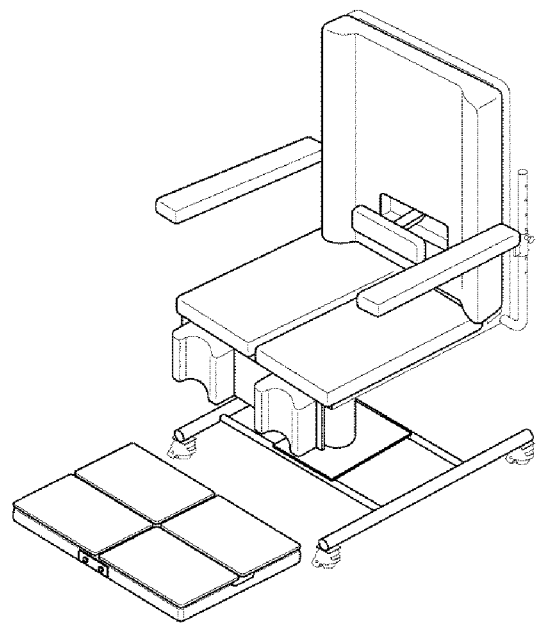
Figure 2C:
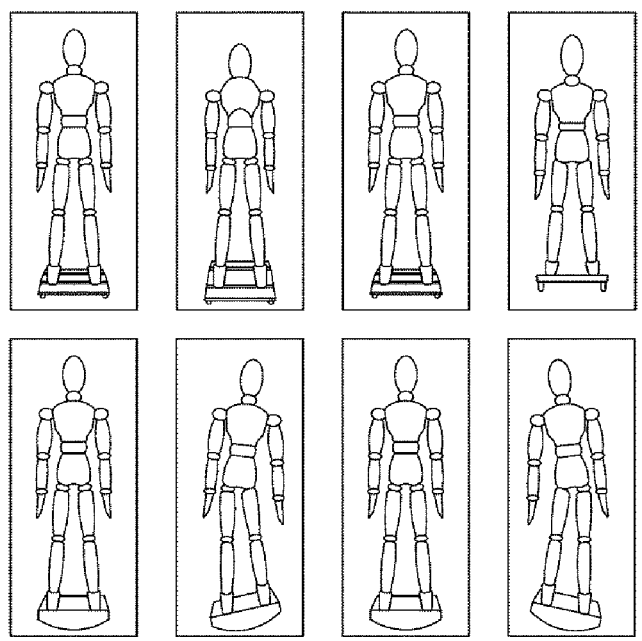

FIG. 1 is a block view illustrating a system for providing sensory effects according to an embodiment of the present invention, FIGS. 2A, 2B, and 2C illustrate sensors detect inclined direction of a human body according to an embodiment of the present invention.

Referring to FIG. 1, a system for providing sensory effects according to an embodiment of the present invention may include an apparatus for providing vestibular rehabilitation videos 110, a gateway 120, a video player 130 and an apparatus for providing sensory effects 140.

The apparatus for providing vestibular rehabilitation videos 110 may receive an individual video from an external device (for example, a camera, a storage medium and the like), generate and store an integrated file according to the individual video, and convert the integrated file into transmission data to transmit to the gateway 120 through network.

The gateway 120 may receive the transmission data and transmit at least one of video data, audio data and sensory effect metadata included in the transmission data to the video player 130 and the apparatus for providing sensory effects 140.

The video player 130 may receive video data and audio data from the gateway 120 and output the video data and the audio data with video and sound, respectively. Here, the video player 130 may be more than one, preferably may be arranged in directions of front, left side, right side, back and the like.

The apparatus for providing sensory effects 140 may receive sensory effect metadata from the gateway 120 and provide sensory effects based on the sensory effect metadata. For example, the apparatus for providing sensory effects may provide at least one effect of wind, light (strobe, flash), temperature, scent, shade, air jet, spray, tickler, motion and vibration.

The apparatus for providing sensory effects may comprise sensor detects inclined direction of a human body and makes metadata including the inclined direction of the human body. The sensor does not specify any sensing methods such as strain gauge and gravity technologies. Therefore, any measurement specific to the particular sensing technologies is not the scope of the sensor. The applications of the sensor may include health care service such as VAT. FIGS. 2A, 2B, and 2C show sensors (for example, CoM-Center of Mass sensor) included in the apparatus for providing sensory effects. The apparatus for providing sensory effects provides sensory effects according to receive the sensory effect metadata and metadata from the sensor.

Figure 4:
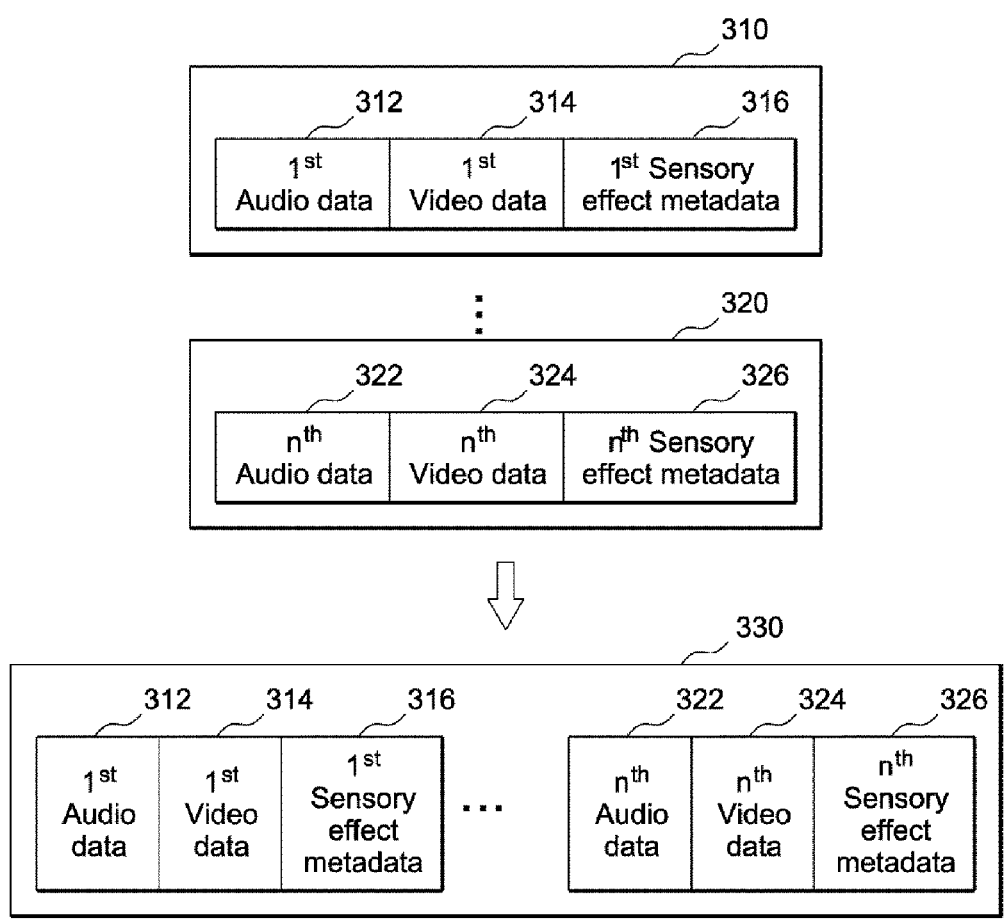
FIG. 4 illustrates a process for generating an integrated file by an apparatus for providing vestibular rehabilitation videos of a system for providing sensory effects according to an embodiment of the present invention.
Figure 5:
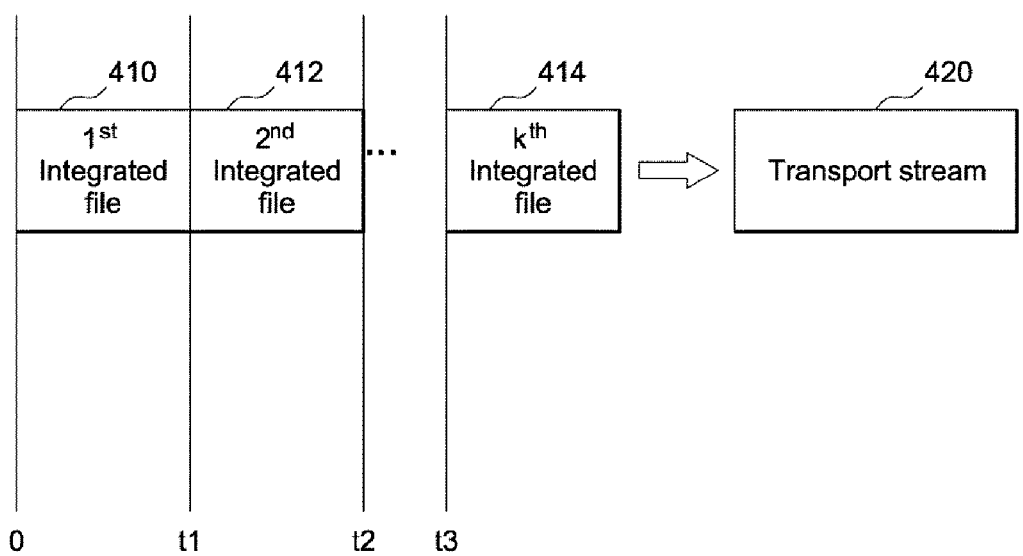
FIG. 5 illustrates a process for generating a transmission file by an apparatus for providing vestibular rehabilitation videos of a system for providing sensory effects according to an embodiment of the present invention.

FIG. 3 is a flowchart illustrating a process for transmitting transmission data by an apparatus for providing vestibular rehabilitation videos of a system for providing sensory effects according to an embodiment of the present invention. FIG. 4 illustrates a process for generating an integrated file by an apparatus for providing vestibular rehabilitation videos of a system for providing sensory effects according to an embodiment of the present invention. FIG. 5 illustrates a process for generating a transmission file by an apparatus for providing vestibular rehabilitation videos of a system for providing sensory effects according to an embodiment of the present invention.

Referring to FIG. 3, in S210, the apparatus for providing vestibular rehabilitation videos 110 may receive more than one individual videos from external devices. Here, the individual video may include audio data, video data and sensory effect metadata.

In S220, the apparatus for providing vestibular rehabilitation videos 110 may synchronize playback time of the audio data, the video data and the sensory effect metadata. For example, the apparatus for providing vestibular rehabilitation videos 110 may setup decoding time stamp (DTS) and presentation time stamp (PTS) of the audio data, the video data and the sensory effect metadata based on program clock reference (PCR).

In S230, the apparatus for providing vestibular rehabilitation videos 110 may generate at least one integrated file by inserting audio data and video data of an individual file into a track area and inserting sensory effect metadata into a metadata area.

Here, the apparatus for providing vestibular rehabilitation videos 110 may generate an integrated file by arranging audio data, video data and sensory effect metadata of an individual file among individual files to be played for the same time zone to be adjacent each other and arranging audio data of another individual file to be adjacent to the sensory effect metadata of the individual file. For example, as shown in FIG. 4, when there are a first individual file 310 to a $n^{th}$ individual file 320 in which n is a natural number of 2 or higher, the apparatus for providing vestibular rehabilitation videos 110 arranges the first audio data 312, the first video data 314, and the first sensory effect metadata 316 in order, then arranges the audio data, the video data, the sensory effect metadata of a next individual file in order, and then arranges the $n^{th}$ audio data 322, the $n^{th}$ video data 324, and the $n^{th}$ sensory effect metadata 326 of the $n^{th}$ individual file 320 in order to generate an integrated file 330. The apparatus for providing vestibular rehabilitation videos 110 may generate a plurality of integrated files by this method.

In S240, when a predetermined event (for example, input to distribute an integrated file by a user) is received, the apparatus for providing vestibular rehabilitation videos 110 may extract audio data, video data and sensory effect metadata of each track of the plurality of integrated files.

In S250, the apparatus for providing vestibular rehabilitation videos 110 may correct playback time of sensory effect metadata based on start time of transport stream. The apparatus for providing vestibular rehabilitation videos 110 may correct playback time of sensory effect metadata, based on integrated time of playback time up to a previous integrated file and playback time pre-stored in the sensory effect metadata. For example, as shown in FIG. 5, it is assumed that there are a first integrated file 410 to a $k^{th}$ integrated file 414 in which n is a natural number of 2 or higher and it is played with an order from the first integrated file 410 to the $k^{th}$ integrated file 414. It is also assumed that t1 is time to play the first integrated file 410, t2 is time to play the second integrated file 412, and t3 is time to reproduce the integrated file which is right before the $k^{th}$ integrated file 414 (hereinafter, the time to reproduce all integrated files is referred to as "accumulated playback time"). The apparatus for providing vestibular rehabilitation videos 110 may not correct playback time of the sensory effect metadata included in the first integrated file since there is no integrated file before the first integrated file 410. The apparatus for providing vestibular rehabilitation videos 110 may correct playback time included in the sensory effect metadata of the second integrated file 412, based on sum of accumulated playback time, t1, and playback time included in the sensory effect metadata. For example, when accumulated playback time of the second integrated file 412 (which is time to play up to the first integrated file 410) is 1 minute and playback time included in the sensory effect metadata of the second integrated file 412 is 2 seconds, playback time included in the sensory effect metadata may be corrected to 1 minute and 2 seconds. The apparatus for providing vestibular rehabilitation videos 110 may correct other playback times of the sensory effect metadata up to the $k^{th}$ integrated file 414 by this method.

In S260, the apparatus for providing vestibular rehabilitation videos 110 may extract audio data, video data and sensory effect metadata corresponding to the time zone of a predetermined unit and arrange them in order, and then arrange audio data, video data and sensory effect metadata corresponding to a next time zone to generate transmission stream and transmit the result to the gateway 120. Here, the apparatus for providing vestibular rehabilitation videos 110 may fragment the sensory effect metadata into an effect unit and arrange the audio data, the video data and the sensory effect metadata corresponding to playback time of the fragmented sensory effect metadata in order.

Thus, when a plurality of integrated files are transmitted continuously through a single stream, the apparatus for providing vestibular rehabilitation videos 110 may let the gateway 120 check playback time of each sensory effect metadata. Playback time of the sensory effect metadata included in the individual file and the integrated file is set based on playback time of the audio data and the video data included in each individual file or the integrated file. However, transport stream which streams a plurality of integrated files continuously does not include start time information of video of each integrated file. The gateway 120 may thus check only playback time of sensory effect metadata and time when the transport stream is started. Since the apparatus for providing vestibular rehabilitation videos 110 corrects playback time of sensory effect metadata based on the start time of transport stream, the gateway 120 may determine when sensory effects of sensory effect metadata have to be played based on the transport stream only by checking playback time included in the sensory effect metadata.

The apparatus for providing vestibular rehabilitation videos 110 fragments sensory effect metadata into an effect unit and transmits only sensory effect metadata corresponding to playback time of audio data and video data so that when the gateway 120 does not receive the sensory effect metadata normally (e.g., when sensory effect metadata is lost during transmission), volume of the sensory effect metadata to be re-transmitted may be reduced.

Figure 6:
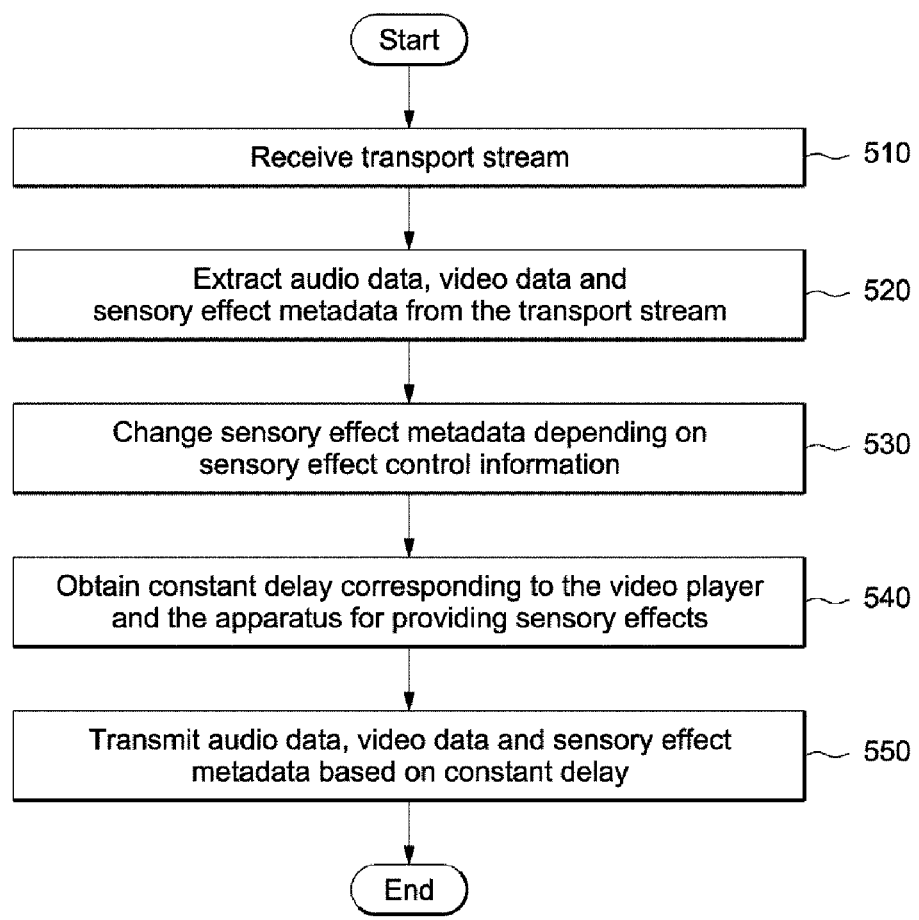
FIG. 6 is a flowchart illustrating a process for transmitting stream by a gateway of a system for providing sensory effects according to an embodiment of the present invention.

FIG. 6 is a flowchart illustrating a process for transmitting stream by a gateway of a system for providing sensory effects according to an embodiment of the present invention. Each process to be explained below is a process for receiving transmission files during unit time zone and is repeated till entire zones of transmission files are received and data is transmitted to the video player 130 and the apparatus for providing sensory effects 140.

Referring to FIG. 6, in S510, the gateway 120 may receive transport stream from the apparatus for providing vestibular rehabilitation videos 110.

In S520, the gateway 120 may extract audio data, video data and sensory effect metadata from the transport stream. When sensory effect metadata, which is extracted previously, exists, the gateway 120 may also defragment the sensory effect metadata extracted in S520 and the previously extracted sensory effect metadata. Even though the sensory effect metadata extracted in S520 is the data which refers to the previously extracted sensory effect metadata, the gateway 120 may thus play normally sensory effects according to the sensory effect metadata extracted in S520.

In S530, the gateway 120 may change the sensory effect metadata depending on sensory effect control information. The sensory effect control information is predetermined information to change intensity of sensory effects and playback method based on user's preference or qualification of each apparatus for providing sensory effects. For example, when a user dislikes red light (strobe, flash) and even though vestibular rehabilitation sensory effect metadata is set to display red, sensory effect control information is set to output orange color for red, the gateway 120 may change sensory effect metadata to display orange color for red. As another example, when the maximum intensity of wind, which the apparatus for providing sensory effects 140 can reproduce, is A cm/s (A is a predetermined real number) and sensory effect control information is set to correct the maximum intensity to A, the gateway 120 may change to set the maximum intensity of sensory effect metadata to be A even though the maximum intensity is set to be A or higher in the sensory effect metadata. The gateway 120 may also change playback intensity of the sensory effect metadata based on the change ratio of the maximum intensity. The gateway can have functionalities such as sensory effect manipulation, sensory effect retrieval, sensory effect adaptation, sensory effect actuation. The sensory effect manipulation function can access sensory effect metadata structures. It can initialize the gateway 120, parse the sensory effect metadata structures, store the parsed sensory effect metadata elements in memory or storage, remove or update the stored sensory effect metadata elements from the memory or storage. The sensory effect retrieval function can retrieve sensory effect metadata structures. It can retrieve sensory effect metadata structures by ID, Type, Filter or Comparison. The sensory effect adaptation function can get device capabilities, user preferences, sensor capabilities, and sensed data from the memory or storage. The sensory effect actuation function can map sensory effect metadata elements to device commands based upon device capabilities, user preferences, sensor capabilities, sensed data.

In S540, the gateway 120 may obtain constant delay between the gateway 120 and each of the video player 130 and the apparatus for providing sensory effects 140. For example, the gateway 120 may transmit time information to each of the video player 130 and the apparatus for providing sensory effects 140 and receive constant delay from each of the video player 130 and the apparatus for providing sensory effects 140. Here, when time information is received, the video player 130 and the apparatus for providing sensory effects 140 may conduct playback of video or playback of sensory effects for test and generate constant delay for the difference between the start time of playback of video or playback of sensory effects and time information to transmit to the gateway 120.

In S550, the gateway 120 may transmit audio data and video data to the video player 130 and transmit sensory effect metadata to the apparatus for providing sensory effects 140. Here, the gateway 120 may delay transmission of audio data and video data or sensory effect metadata for the difference between the maximum value among constant delays received from each of the video player 130 and the apparatus for providing sensory effects 140 and constant delay of the video player 130 or the apparatus for providing sensory effects 140 to which data is to be transmitted (hereinafter, referred to as transmission target device). Therefore, even though delay is occurred non-uniformly in each of the video player 130 and the apparatus for providing sensory effects 140, the gateway 120 may perform playback of audio data, video data and sensory effect metadata at the exact time.

Accordingly, even though one transport stream is transmitted from the apparatus for providing vestibular rehabilitation videos 110 to the gateway 120, the system for providing sensory effects according to an embodiment of the present invention may implement sensory effects based on sensory effect metadata at normal time. Even though network delay, caused between the gateway 120 and the video player 130 and the apparatus for providing sensory effects 140, is different from constant delay of each of the video player 130 and the apparatus for providing sensory effects 140 according to performance difference of the video player 130 and the apparatus for providing sensory effects 140, the system for providing sensory effects may also reproduce video or sensory effects based on exact synchronization between the video player 130 and the apparatus for providing sensory effects 140.

Figure 7:
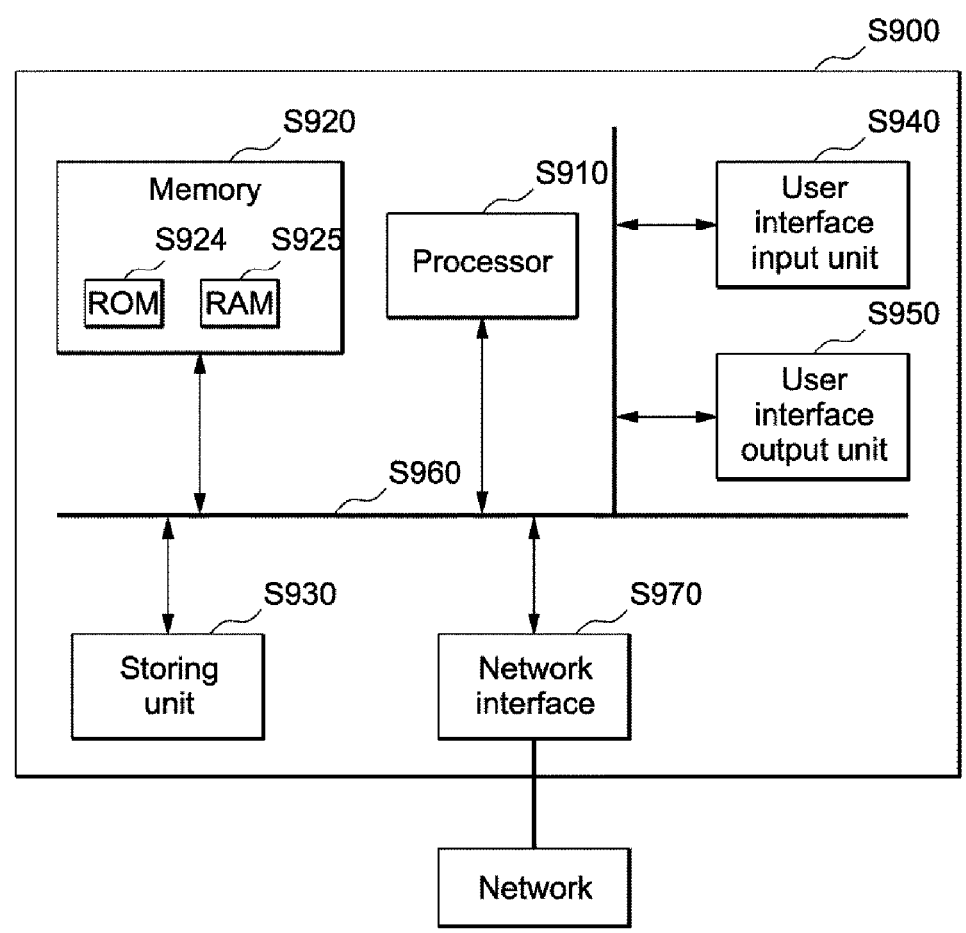
FIG. 7 is a block view illustrating structure of an apparatus for providing vestibular rehabilitation videos and a gateway of a system for providing sensory effects according to an embodiment of the present invention.

FIG. 7 is a block view illustrating structure of an apparatus for providing vestibular rehabilitation videos and a gateway of a system for providing sensory effects according to an embodiment of the present invention.

The apparatus for providing vestibular rehabilitation videos 110 and gateway 120 according to embodiments of the present invention may be implemented in a computer system, for example, a computer readable recording medium. As shown in FIG. 6, a computer system 900 may include at least one of at least one processor 910, a memory 920, a storing unit 930, a user interface input unit 940 and a user interface output unit 950. The computer system 900 may further include a network interface 970 to connect to a network. The processor 910 may be a CPU or semiconductor device which executes processing commands stored in the memory 920 and/or the storing unit 930. The memory 920 and the storing unit 930 may include various types of volatile/non-volatile storage media. For example, the memory may include ROM 924 and RAM 925.

Accordingly, exemplary embodiments of the present invention may be implemented by a method implemented with a computer or by a non-volatile computer recording medium in which computer executable commands are stored. The commands may be performed by at least one embodiment of the present invention when they are executed by the processor.

The exemplary embodiment of the present invention can be implemented by the method which the computer is implemented or in non-volatile computer recording media stored in computer executable instructions. The instructions can perform the method according to at least one embodiment of the present invention when they are executed by a processor.

The computer readable medium may include a program instruction, a data file and a data structure or a combination of one or more of these.

The program instruction recorded in the computer readable medium may be specially designed for the present invention or generally known in the art to be available for use. Examples of the computer readable recording medium include a hardware device constructed to store and execute a program instruction, for example, magnetic media such as hard disks, floppy disks, and magnetic tapes, optical media such as CD-ROMs, and DVDs, and magneto-optical media such as floptical disks, read-only memories (ROMs), random access memories (RAMs), and flash memories. In addition, the above described medium may be a transmission medium such as light including a carrier wave transmitting a signal specifying a program instruction and a data structure, a metal line and a wave guide. The program instruction may include a machine code made by a compiler, and a high-level language executable by a computer through an interpreter.

The above described hardware device may be constructed to operate as one or more software modules to perform the operation of the present invention, and vice versa.

While it has been described with reference to particular embodiments, it is to be appreciated that various changes and modifications may be made by those skilled in the art without departing from the spirit and scope of the embodiment herein, as defined by the appended claims and their equivalents.

What is claimed is:

1. A system for providing sensory effects comprising:
an apparatus for providing vestibular rehabilitation videos configured to correct playback time of sensory effect metadata included in a plurality of integrated files based on start time of transport stream and generate transport stream including the sensory effect metadata; and
a gateway configured to receive the transport stream from the apparatus for providing vestibular rehabilitation videos, extract audio data, video data and the sensory effect metadata from the transport stream, transmit the audio data and the video data to a video player, and transmit the sensory effect metadata to an apparatus for providing sensory effects based on the corrected playback time,
wherein each integrated file of the transport stream comprises respective individual file audio data, video data and sensory effect metadata, the individual file sensory effect metadata being located in a metadata area separate from individual file audio and video data, and
wherein the apparatus for providing vestibular rehabilitation videos corrects sum of accumulated playback time of the integrated file and the playback time of sensory effect metadata with the playback time of sensory effect metadata.

2. The system for providing sensory effects of claim 1, wherein the apparatus for providing vestibular rehabilitation videos generates the integrated file by arranging audio data, video data and sensory effect metadata of an individual file among a plurality of individual files to be adjacent each other and arranging audio data of another individual file to be adjacent to the sensory effect metadata of the individual file; and converts the integrated file into the transport stream when a predetermined event occurs.

3. The system for providing sensory effects of claim 1, wherein the gateway obtains constant delay corresponding to a plurality of video players and apparatuses for providing sensory effects, transmits the audio data and the video data to the video player based on the constant delay, and transmits the sensory effect metadata to the apparatus for providing sensory effects based on the constant delay.

4. The system for providing sensory effects of claim 3, wherein the gateway transmits time information to the video player and the apparatus for providing sensory effects and obtains the constant delay from the video player and the apparatus for providing sensory effects.

5. The system for providing sensory effects of claim 1, wherein the gateway changes the sensory effect metadata based on predetermined sensory effect control information.

6. A method for providing sensory effects comprising:
receiving a plurality of integrated files including multimedia content and sensory effect metadata through a transport stream;
extracting audio data, video data, and the sensory effect metadata from the transport stream;
receiving sensed data from at least one sensor device;
adapting the sensory effect metadata depending on at least one of capability of an apparatus for providing sensory effects, user preferences, capability of the at least one sensor device, and the sensed data, and mapping the sensory effect metadata to device commands; and; and
transmitting the audio data and the video data to a video player, and transmitting the device commands to an apparatus for providing sensory effects,
wherein the at least one sensor device includes a Center of Mass (CoM) sensor detecting an inclined direction of a human body,
wherein the multimedia content includes vestibular rehabilitation videos, and
wherein each integrated files of the transport stream comprises respective individual file audio data, video data, and sensory effect metadata, the individual file sensory effect metadata being located in a metadata area separate from the individual file audio and video data.

7. The method according to claim 6, wherein the sensory effects based on the device commands and the multimedia content are reproduced in a synchronized manner.

8. The method according to claim 6,
wherein the multimedia content and the sensory effect metadata are received using a broadcasting technology.

9. A gateway apparatus for adapting sensory effects, comprising a memory storing a program code and at least one processor executing the program code,
wherein the program code is configured to
receive a plurality of integrated files including multimedia content and sensory effect metadata through a transport stream;
extract audio data, video data, and the sensory effect metadata from the transport stream;
receive sensed data from at least one sensor device;
adapt the sensory effect metadata depending on at least one of capability of an apparatus for providing sensory effects, user preferences, capability of the at least one sensor device, and the sensed data, and map the sensory effect metadata to device commands; and
transmit the audio data and the video data, and transmit the device commands to an apparatus for providing sensory effects,
wherein the at least one sensor device includes a Center of Mass (CoM) sensor detecting an inclined direction of a human body,
wherein the multimedia content includes vestibular rehabilitation videos, and
wherein each integrated files of the transport stream comprises respective individual file audio data, video data, and sensory effect metadata, the individual file sensory effect metadata being located in a metadata area separate from the individual file audio and video data.

10. The gateway apparatus according to claim 9, wherein the sensory effects based on the device commands and the multimedia content are reproduced in a synchronized manner.

11. The gateway apparatus according to claim 9, wherein the multimedia content and the sensory effect metadata are received using a broadcasting technology.

\* \* \* \* \*